United States Patent Office 3,224,819
Patented Dec. 21, 1965

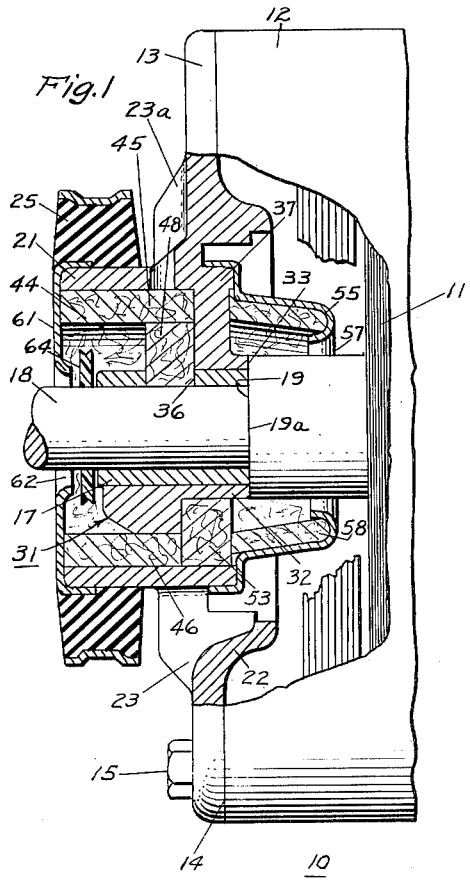
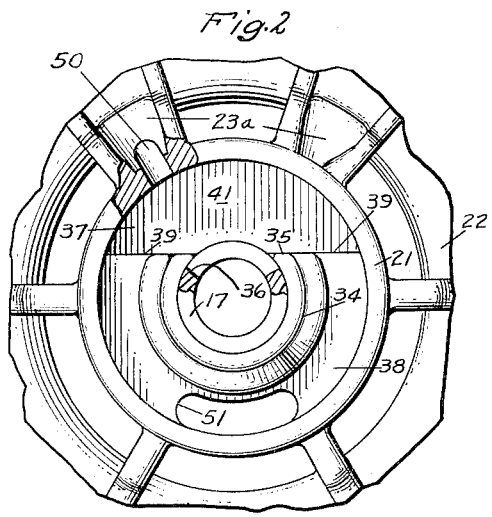
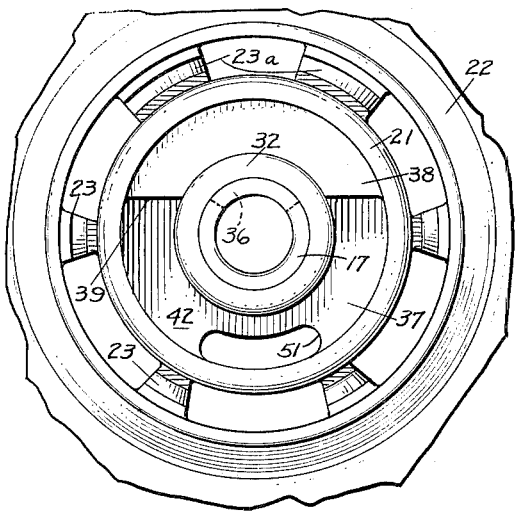
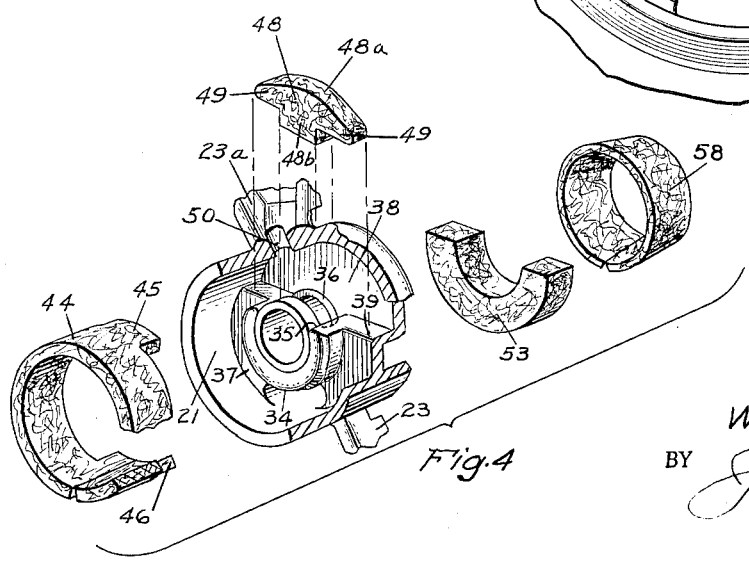

3,224,819
BEARING SUPPORT AND LUBRICATION ARRANGEMENT FOR USE IN A DYNAMOELECTRIC MACHINE
William R. Hunt, Fort Wayne, Ind., assignor to General Electric Company, a corporation of New York
Filed Feb. 5, 1964, Ser. No. 342,735
7 Claims. (Cl. 308—132)

This invention relates generally to a bearing support and lubrication arrangement and in particular to such arrangement especially suitable for use in an end frame of a dynamoelectric machine which achieves satisfactory and positive lubrication of the machine shaft as well as a strong mount for the bearing.

In the design of rotating equipment, the shaft is frequently journalled at either end by a sleeve type bearing mounted within a so-called bearing housing. For instance, it has been conventional in certain dynamoelectric machine constructions to furnish this housing centrally in a cast end frame employing the approach illustrated in FIG. 1 of the Dimke Patent No. 3,038,764 issued June 12, 1962. The housing normally includes a number of angularly spaced apart integral spiders which extend inwardly from an axial extension and terminate in a central hub portion which in turn mounts the sleeve type bearing by an interference fit with it. Pads of lubricant absorbent material are arranged in the cavity between the axial extension and hub to form a reservoir for holding a supply of lubricant. Communication from the reservoir to the bearing journal is provided by a wick disposed in an opening extending entirely through both the hub and bearing intermediate their ends, the openings being in radial alignment for this purpose.

Unfortunately, this generally accepted approach, although basically simple in design, has not been entirely satisfactory in actual practice for several reasons. For example, when the bearing is pressed into the cast hub of the end frame, there is a tendency for the hub portion to crack or split in the vicinity of the hub opening or window. In some cases, discontinuities or other defects may occur in that location even before the bearing is mounted. In certain machine sizes, end frame rejects due to the above defects has reached as high as 30%. In studying this problem, I have found that one significant reason for this situation is attributable to the spider and hub structure which, among other things, is difficult to cast without adversely affecting the strength of the mount. Another problem created by the structure is the difficulty in maintaining the wick in engagement with the shaft as well as the time and effort required to install the reservoir pads properly into the housing cavity. This effort is magnified when the lubrication arrangement is of the type having a lubrication sump return at each end of the bearing and hub.

It is therefore a general object of the present invention to provide an improved bearing support and lubricating arrangement, and a more specific object is the provision of such arrangement especially suitable for use in an end frame of a dynamoelectric machine which overcomes the problems mentioned above in prior structures.

It is another object of the present invention to provide an inexpensive yet improved cast end frame for use in a dynamoelectric machine having a bearing supporting and lubrication housing which is simple in construction, permits ease in its manufacture and facilitates the installation of lubricant carrying components, provides a positive and entirely adequate lubrication for the journal surfaces, and furnishes a strong mount for the bearing.

In carrying out the objects in one form, I provide an improved yet low cost bearing support and lubrication arrangement for journalling one end of a shaft in a cast dynamoelectric machine end frame. A cast supporting wall mounts an elongated generally annular housing in which is disposed first and second hub section integrally joined together for carrying a sleeve type bearing. One hub section has a space extending therethrough in radial alignment with a bearing window formed intermediate the outboard and inboard ends of the bearing. This space is open at the outboard end of the bearing and has an angular length less than 180° so that the hub section may provide a strong mount for the associated end of the bearing. A web connects this hub section and housing together on the side of the hub section remote from the bearing opening. The second hub section is connected to the housing by a web formed adjacent the space on the inboard side of the frame, in axially spaced but in angularly opposed relation to the first web. The area between the unconnected portion of the second hub section and the housing in effect forms a chamber for accommodating lubricant absorbent material, such as an arcuate shaped felt pad. Integral walls join the web together on either side of the bearing opening and provide a planar surface on which is seated transverse legs of a generally T-shaped wick, with the central leg of the wick depending through the aligned hub and bearing openings for positive engagement with the shaft. Lubricant absorbent material, positioned within the outboard side of the housing, retains the T-shaped wick in position under compression and connects the wick with the pad for transferring lubricant by capillary action between these pieces.

This arrangement furnishes a strong support for the bearing regardless of the angle at which the end frame is finally mounted and substantially eliminates defects which might occur in the hub as a result of the casting operation. In addition, component parts of the lubrication system may quickly be installed and lubrication of the rotatable shaft economically achieved. Further advantages and features of the present invention will be set out more fully in the following portion of the specification.

The subject matter which I regard as my invention is particularly pointed out and distinctly claimed in the concluding portion of this specification. My invention, itself, however, both as to its organization and method of operation, together with further objects and advantages thereof may best be understood by reference to the following description taken in connection with the accompanying drawing.

In the drawing:

FIG. 1 is a side view, partially cut away and partially in section, of one side of a dynamoelectric machine having an end frame embodying the preferred form of the present invention;

FIG. 2 is an enlarged end view of the central part of the end frame member with other components removed to show the outboard side of the bearing support and lubrication housing incorporated therein;

FIG. 3 is an end view of the housing seen in FIG 2, the view revealing the inboard side of the end frame member; and FIG. 4 is an exploded view in perspective, partially broken away, of the end frame bearing support and lubrication features shown in FIG. 1.

Referring now to the drawing in more detail, the preferred embodiment of my invention is illustrated in connection with dynamoelectric machine, partially shown in FIG. 1 and generally indicated by numeral 10. The machine has a conventional stator 11 suitably mounted within a frame formed by a central shell 12 and a pair of end frames 13 each having a supporting member, cast from suitable material such as aluminum. One of the end frames is secured to each end of the shell in any well-known way, as for example, by a rabbet connection 14 and a number of through-bolts 15 in the usual way. For simplicity of illustration, only one end frame has been shown in detail but it will be understood that the other end frame may be of identical construction if so desired. These end frames mount standard sleeve type bearings 17 to journal a shaft 18 which carries a rotor (not shown) for relative rotation within a stator bore in the normal fashion.

Turning now to the illustrated form of end frame 13, it will be observed from the various figures that the end frame is furnished with a centrally disposed bearing support and lubrication arrangement. More specifically, the end frame is provided with an elongated, annular, and axially projecting outer housing 21 which is integrally joined in spaced relation to an inwardly projecting flange 22 of the cast support member by a number of radial spokes or spiders 23, spaced angularly around the housing such that the outboard end of the housing extends axially away from flange 22. The outside surface of this end may be used to mount a standard resilient cushion 25. Bearing 17 is supported within housing 21 by a hub 31 which has a section 32 entirely surrounding the inboard end of the bearing and provides a stationary thrust-receiving surface at its free end, indicated by numeral 33. This surface is arranged to abut against and cooperate with rotatable shoulder 19 of the rotor carrying shaft. The cooperating shaft shoulder and thrust-receiving surface should be accurately finished as by a machining operation to provide planes made perpendicular to the axis of the shaft for the thrust transferring function. In addition, the outer periphery of shoulder 19 should terminate in a sharp edge 19a so that it may serve as a lubricant slinger during rotation of the shaft.

Turning again to the description of hub 31 seen in FIGS. 2 and 4, the hub includes section 34 at its outboard end as well as at the central portion thereof which has an angular length substantially less than 360° but somewhat greater than 180° to provide a sufficient angular hub length for retaining the outboard end of the bearing in a rigid support. This structure provides an unobstructed, generally rectangular slot or space indicated at 35 which is open at the outboard end of the hub and preferably presents an opening with an axial cross-section for the greater axial length of hub 31. In the illustrated form, space 35 has an arcuate length slightly less than that of the generally rectangular shaped lubricant passageway or window 36 provided centrally through the bearing in the usual way. An integral radial web or wall 37, angularly remote from space 35, structurally joins hub section 34 to the inner surface of housing 31 for the greater portion of the angular length of that section at a location adjacent the end of section 34 axially inward from the extreme end of the housing.

Adjacent the inboard side of the bearing, hub section 32 is rigidly united to housing 31 by a solid, integral, radial web 38 for a length less than 180° on the radial side of the hub, opposite and in axially spaced but angularly overlapping relation to web 37. That is, web 38 is adjacent space 35 on the inboard side of the structure. These webs are integrally joined together at each side by axial wall portions 39 for the radial extent of the webs, best seen in FIG. 4, the wall portions 39 being non-radial to provide a plane in alignment with space 35 and window 36 for the reason set out hereinafter. It should be noted that along with the outer surface of the bearing in the vicinity of bearing window 36, the bearing support structure defines two angularly complementary chambers or compartments indicated at 41 in FIG. 2 and 42 in FIG. 3, with the larger compartment being located at the inboard side of the end frame.

From the above description and the drawing, it will be observed that webs 37 and 38, in cooperation with hub sections 32 and 34 and the inner surface of housing 21, form unusually rigid supports for bearing 17, whether the machine is finally mounted with its shaft axis vertical, horizontal, or any intermediate angle. In addition, this structure allows simplification in conventional casting processes so that imperfections, such as cracks or the like, in hub 31 are substantially eliminated as compared with other cast constructions known to me. This is explained more fully hereinafter.

At the outboard side of the end frame, arranged between the inner surface of housing 21 and hub section 34, there is positioned an annulus of absorbent material 44, such as a piece of felt which is rolled into a circle as shown in FIG. 4. The edge of the circular piece facing the inboard side of the frame is formed with diametrically opposed fingers 45, 46, such that when piece 44 is in position within housing 21, finger 45 projects directly over the aligned bearing window 36 and hub space 35. Arranged in openings 35, 36 and communicating between finger 45 and the shaft is a generally T shaped wick 48 formed of any suitable lubricant absorbent material, such as fiberous felt or cellular plastic, having a convex outer surface 48a and a central depending leg 48b with a lower edge adapted to furnish a wiping engagement with shaft 18 during operation of machine. The lateral legs 49 of the wick extend over and are seated on planar walls 39 for support. By properly dimensioning of central depending leg 48b and its total radial depth measured at its center, that is, from convex surface 48a to its lower edge, fingers 45 will bear against surface 48a to maintain leg 48a under compression against the shaft to provide a positive engagement therewith for all angles of mounting the machine 10. The sides of hub section space 35 directly over bearing window 36, being dimensionally less than the transverse dimension of the window (see FIG. 2) and further being disposed above the bearing, may firmly engage the central depending leg 48a, adjacent legs 49 thereby tending to augment this compressive action. In spite of this, with the outboard side of space 35 entirely open, prior to assembly of piece 44, it is an easy matter to install the wick by sliding the center leg 48b along the space until the wick is properly seated in place.

Finger 46, in effect formed by a pair of extensions each provided at the mating edge of piece 44, projects through an accommodating arcuate opening 51 in web 38 to provide lubricant transfer between compartments 41 and 42. For storing lubricant in the enlarged inboard compartment 42, suitable lubricant absorbent material in the form of a felt pad 53 of arcuate configuration, that is, generally conforming in shape to the walls defining that compartment, is furnished. As shown in FIG. 1, finger 46 and pad 53 are in abutting relation so that lubricant may readily be transferred between felt 44 at the outboard side and pad 53 of the inboard compartment.

For adding lubricant or oil to the lubricant absorbent material from time to time as required, two of the spiders 23 which support housing 21 are furnished directly over (as viewed in the drawing) compartment 41 and made with a generally U-shaped cross-section. These spiders are referred by 23a in the drawing. A hole 50 is drilled entirely through housing 21 at the base of at least one of spiders 23a, within the area of the U. This construction allows a choice in exact location for the lubrication admitting entrance of the confines of housing 21 while providing a protected yet easily drilled hole 50 as a result of the U-shaped spiders. For instance, the selected spider 23a assists in guiding the drill bit onto the proper spot on housing 21 when hole 50 is being bored.

It will be recognized by those skilled in the art that due primarily to the construction of webs 37, 38, and space 35, which is entirely unobstructed at the outboard side of housing 21, during the formation of hub 31, loose keys or plugs normally required for conventional cast constructions to provide an opening through the center of the bearing supporting hub are eliminated. Instead a solid plug, filling space 35 as well as the confines of the outboard side of housing 21 may be employed, thus improving the quality of the cast hub. In addition, web 38 as formed rigidly supports hub section 34 where the support is needed and the angularly smaller web 37, made integral with a portion of the 360° hub section 32, furnish a solid mount at the inboard end where strength for receiving thrust loads is required. The construction also facilitates the installation of parts 44, 48, and 53 in their proper positions within housing 21 from the respective open ends of the housing once bearing 17 has been assembled or pressed into hub 31 and retained therein as by an interference fit between these two parts.

Turning now to the details of the inboard side of housing 21, it is closed by a generally cup shaped cap 55 having a peripheral flange 56 mounted to the termination of the housing. This cap carries a relatively thin strip 58 of suitable lubricant absorbent material forced into a frusto conical shape with one edge having a portion held against pad 53 in the manner shown in FIG. 1. A re-entrant flange 57 of cap 55, surrounding shaft 18 axially beyond shoulder 19, assists in supporting strip 58 outwardly of shoulder edge 19a and forces the strip against the pad.

With respect to the outboard side of FIG. 1 once again, the closure of housing 21 is accomplished by an annular cap 61 mounted over the end of the housing in a standard construction with a central flanged hole 62, permitting egress of the output end of the shaft from housing 21 while performing a sealing function. A common lubricant oil thrower or slinger 64, formed by a resilient washer, is connected to rotate with the shaft within the confines of member 44, as by an interference fit. The washer has an annular recess on its periphery to provide sharp edges for this slinging action during rotation of the shaft.

Turning now to the operation of the machine, lubricant absorbent members 44, 53, and 58 are initially saturated with lubricant and wick 48 also has lubricant to establish a capillary path between fingers 46 of piece 44 from surface 48a to the shaft. As the shaft rotates, any lubricant which may be lost from the respective ends of the bearing, is slung outwardly by slinger 64 and edge 19a. This lubricant is recaptured by piece 44 at the outboard side while strip 58 reclaims the lubricant at the other side and returns it by capillary action to wick 48 through pad 53 to fingers 46 and 45 of piece 44 and then finally to the shaft for reuse to furnish a lubricant recirculation type system.

Thus, it will be appreciated from the foregoing that the present invention provides a strong support for a sleeve type bearing, regardless of the angle at which the end frame is finally disposed and substantially eliminates defects which might occur in the hub supporting the bearing adjacent the bearing window. In actual practice when end frames are made in accordance with the illustrated embodiment, defects in the hub 31 supporting the bearing are negligible. Moreover, the component parts of the lubrication system are quickly installed and economically achieve positive lubrication to the shaft.

While in accordance with the Patent Statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a dynamoelectric machine having a rotatable member, at least one end frame for rotatably journalling the member comprising an outer elongated housing; first and second hub sections integrally joined together spaced inwardly from said housing; said hub sections having means for journalling the rotatable member; said first hub section including an unobstructed space therein communicating with the journalling means to permit access to the rotatable member; a first web connecting said first hub section and housing together at an angular location remote from said space; a second web axially spaced from said first web connecting a portion of said second section axially adjacent said space, with said first and second webs being in generally angular complementing relation; a generally T-shaped wick having transverse legs extending beyond the sides of said space in said first hub section and having a central leg depending through said space arranged to engage the rotatable member for furnishing lubricant thereto; first lubricant absorbent means disposed outwardly of said first hub section within said housing and contacting said wick for transferring lubricant thereto; second lubricant absorbent means arranged between the inner surface of said housing and the outer surface of said second hub section remote from said second web; said first and second lubricant absorbent means being in communication for transferring lubricant therebetween by capillary action.

2. In a dynamoelectric machine having a rotatable member, at least one cast end frame for rotatably journalling the rotatable member comprising an outer elongated housing; first and second hub sections integrally joined together spaced inwardly from said housing; said hub sections having bearing means for journalling the rotatable member; said first hub section including an unobstructed space open at one edge thereof to permit access to the rotatable member from a chamber defined outwardly of said hub space; a first web connecting said first hub section and housing together angularly remote from said unobstructed space; a second web axially spaced from and angularly opposed to said first web connecting a portion of said second section to said housing, with a chamber being defined over the unconnected portion of said second hub section; walls joining said webs together on either side of said space; lubricant retaining means arranged in each of said chambers for storing lubricant; lubricant transfer means connecting said lubricant retaining means together; and a wick disposed in said space extending from the lubricant retaining means in the associated chamber to the rotatable member for conveying lubricant thereto by capillary action during rotation of the rotatable member.

3. In a dynamoelectric machine having a rotatable shaft, at least one cast end frame for rotatably journalling the shaft comprising an outer elongated housing; first and second hub sections integrally joined together spaced inwardly from said housing; a sleeve type bearing mounted by said hub sections having an opening therethrough intermediate the outboard and inboard ends of the bearing; said first hub section including an unobstructed space having angular length less than 180° arranged over the bearing opening to permit access thereto and being open at the outboard end of the bearing; a first web connecting said first hub section and housing together angularly remote from said unobstructed space, a second web axially spaced from and angularly opposed to said first web connecting a portion of said second section, axially adjacent said unobstructed space, to said housing defining a chamber over the unconnected portion of said second hub section; walls integrally joining said webs together on either side of said bearing opening with said walls forming a generally planar surface, a generally T-shaped wick having the transverse legs thereof seated on said walls and a central leg depending through the aligned hub space and bearing opening for engaging the shaft; first lubricant absorbent means positioned in said chamber for holding lubricant; second lubricant absorbent means arranged between the inner surface of said housing and the outer surface of said T-shaped wick maintaining said wick in place; said first and second lubricant absorbent means being in communication for transferring lubricant therebetween by capillary action.

4. A supporting structure for journalling a rotatable member comprising a frame, first and second hub sections joined together spaced inwardly from said frame for rotatably mounting the rotatable member, said hub sections including bearing means for journalling the rotatable member, said first hub section having an unobstructed space therethrough to permit access to the rotatable member and being open at the outer edge of said first section, first support means arranged on the side of said first hub section angularly remote from the unobstructed space connecting said frame and section rigidly together, second support means disposed adjacent said space in axially spaced relation to said first means connecting said second hub section and frame together intermediate said space in said first hub and the axial edge of said second hub section, said first and second support means and their associated hub sections defining communicating chambers for storing lubricant, and means for transferring lubricant from the chambers to said space and finally to the rotatable member during rotation thereof.

5. A supporting structure for journalling a rotatable member comprising a cast frame, first and second hub sections integrally joined together spaced inwardly from said frame for rotatably mounting the rotatable member, said hub sections including bearing means for journalling the rotatable member, said first hub section having an unobstructed space therethrough with an angular length less than 180° to permit access to the rotatable member and being open at the outer edge of said first hub section; first support means rigidly connecting said first hub section on the portion thereof remote from the unobstructed space to said frame, second support means disposed adjacent said space connecting said second hub section and frame together at a location intermediate said space in said first hub section and the axial edge of said second hub section, said first and second support means being in axially spaced and generally angularly opposed relation, axially extending wall means integrally joining said first and second hub sections defining areas for storing lubricant with at least one of said areas being in direct communication to said space in said first hub section for transferring lubricant thereto.

6. A supporting and lubricating structure for journalling a shaft comprising a cast frame having a housing, first and second hub sections integrally joined together spaced inwardly from said housing for rotatably mounting the shaft, said hub sections including bearing means for journalling the shaft, said first hub section having an unobstructed space therethrough to permit access to the shaft, said second hub section having a free end thereof of substantially 360° with the edge thereof forming a thrust receiving surface, first support means connecting said first hub section on the portion thereof remote from the unobstructed space rigidly to said housing, second support means disposed adjacent said space connecting said second hub section and frame together at a location intermediate said space in said first hub and the axial edge of said second hub section, said first and second support means being in axially spaced but generally angularly opposed relation, wall means projecting outwardly on either side of said space joining said first and second support means together; said wall and support means defining separated but communicating chambers for storing lubricant with at least one of said chambers being in direct communication to said space in said first hub section for transferring lubricant thereto.

7. A supporting structure for journalling a shaft comprising a frame, a housing, a number of angularly spaced apart spiders mounting the outer surface of the housing in spaced relation to the frame, first and second hub sections joined together inwardly from said housing including bearing means for journalling the shaft, said first hub section having an unobstructed space therethrough to permit access to the shaft and being open at the outer end of said first section, first support means connecting the portion of said first hub section remote from the unobstructed space to said housing, second support means connecting said second hub section to said housing intermediate said space of first hub section and the free end of said second hub section, wall means joining said first and second support means together intermediate the inner surface of the housing and the outer surface of said hub sections forming individual lubricant accommodating areas, at least one of said spiders having a generally U-shaped cross-section with a base at the outer surface of the housing disposed in the vicinity of one of said areas, and a hole extending from a location within the confines of said one spider at said base to said one area for admitting lubricant thereto.

References Cited by the Examiner
UNITED STATES PATENTS 2,751,265 6/1956 Wightman _____ 308—132
2,752,208 6/1956 Wightman _____ 308—132

DON A. WAITE, *Primary Examiner.*
FRANK SUSKO, *Examiner.*